United States Patent [19]

Hess

[11] 3,918,991
[45] Nov. 11, 1975

[54] SODIUM-HALOGEN BATTERY

[75] Inventor: Heinrich J. Hess, Schenectady, N.Y.

[73] Assignee: General Electric Company, Schenectady, N.Y.

[22] Filed: Sept. 20, 1974

[21] Appl. No.: 507,762

Related U.S. Application Data

[63] Continuation of Ser. No. 291,806, Sept. 25, 1972, abandoned.

[52] U.S. Cl. ............. 136/83 R; 136/6 L; 136/86 A
[51] Int. Cl. .......................................... H01m 23/02
[58] Field of Search .......... 136/83 R, 86 A, 20, 153, 136/6 L

[56] References Cited
UNITED STATES PATENTS

| | | | |
|---|---|---|---|
| 3,607,405 | 9/1971 | Christopher | 136/20 |
| 3,607,417 | 9/1971 | McRae | 136/86 A |
| 3,762,955 | 10/1973 | Dubin | 136/83 R |
| 3,793,080 | 2/1974 | Hess | 136/83 R |
| 3,817,790 | 6/1974 | Mitoff | 136/83 R |
| 3,826,685 | 7/1974 | Dubin et al. | 136/83 R |

*Primary Examiner*—John H. Mack
*Assistant Examiner*—C. F. Lefevour
*Attorney, Agent, or Firm*—Paul R. Webb, II; Joseph T. Cohen; Jerome C. Squillaro

[57] ABSTRACT

A sodium-halogen battery is disclosed which comprises a casing, an anode positioned in the casing, the anode consisting of sodium in a non-aqueous organic electrolyte of pure 1,2-dimethoxyethane containing a dissolved sodium salt therein, the salt selected from the class consisting of sodium perchlorate and sodium bromide, a solid sodium ion-conductive electrolyte adjacent the anode, and a cathode positioned adjacent the opposite side of the solid electrolyte.

6 Claims, 1 Drawing Figure

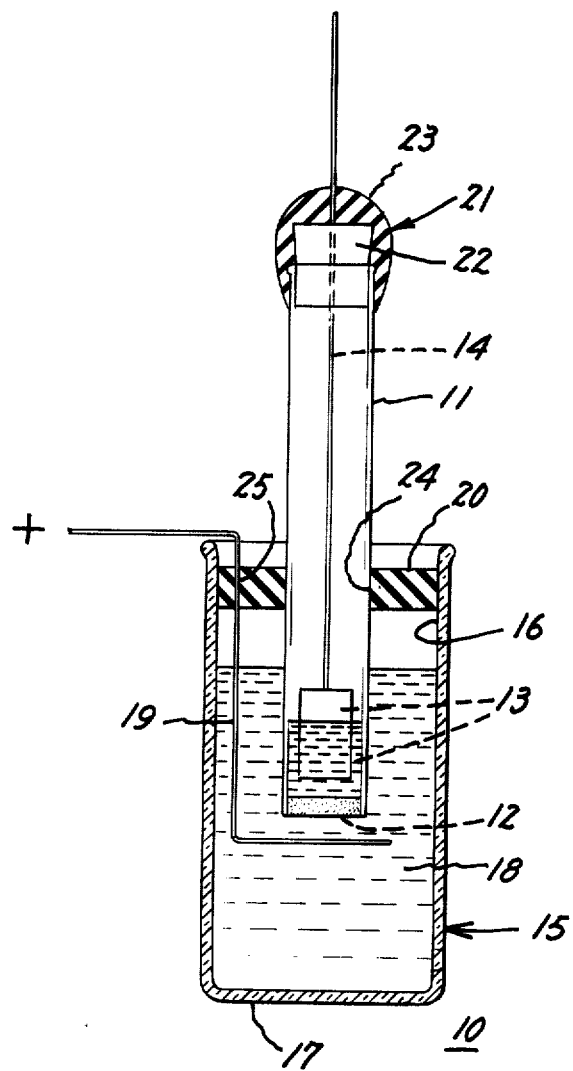

3,918,991

SODIUM-HALOGEN BATTERY

This is a continuation of application Ser. No. 291,806, filed Sept. 25, 1972, now abandoned.

This invention relates to batteries and, more particularly, to such batteries employing an anode of sodium in a non-aqueous organic electrolyte, a solid sodium ion-conductive electrolyte, and a cathode.

Sodium-sulfur cells, which operate at elevated temperatures, are known in the prior art as, for example, described in Kummer et al. U.S. Pat. No. 3,404,036 issued Oct. 1, 1968 under the title "Energy Conversion Device Comprising a Solid Crystalline Electrolyte and a Solid Reaction Zone Separator". The solid crystalline ion-conductive eletrolyte in the above-mentioned sodium sulfur battery can be sodium beta-alumina.

In copending patent application Ser. No. 153,364, filed June 15, 1971 in the names of Stephan P. Mitoff and Fritz G. Will and entitled "Sealed Primary Sodium-Bromine Battery", there is described and claimed such a battery which has a casing, anode positioned in the casing, the anode selected from the class consisting of sodium, sodium as an amalgam, and sodium in a non-aqueous organic electrolyte, a solid sodium ion-conductive electrolyte adjacent the anode, and a bromine ion-conductive material cathode positioned adjacent the opposite side of the electrolyte.

In copending patent application Ser. No. 216,427 filed Jan. 10, 1972 now U.S. Pat. No. 3,793,080 in the name of Heinrich J. Hess and entitled "Sealed Primary Sodium-Halogen Battery with Bromine-Iodine Mixture", there is described and claimed a sealed primary sodium halogen battery employing a sodium type anode and a cathode of a mixture of bromine and iodine in conductive material.

In copending patent application Ser. No. 291,807, filed Sept. 25, 1972 in the names of Fritz G. Will and Heinrich J. Hess and entitled "Sodium-Halogen Battery", there is described and claimed a sodium-halogen battery employing an anode consisting of sodium in a non-aqueous electrolyte of purified ethylenediamine containing a dissolved sodium salt therein. The above three copending patent applications are assigned to the same assignee as the present application.

Our present invention is directed to providing a sodium-halogen battery which is operated advantageously at low temperatures of from −48°C to 20°C.

The primary object of our invention is to provide a low temperature battery which has a zero self-discharge rate, high cell voltage, and high energy density.

In accordance with one aspect of our invention, a sodium-halogen battery comprises a casing, an anode positioned in the casing, the anode consisting of sodium in a non-aqueous organic electrolyte of pure 1,2-dimethoxyethane containing a dissolved sodium salt therein, the salt selected from the class consisting of sodium perchlorate and sodium bromine, a solid sodium ion-conductive electrolyte adjacent the anode, and a cathode positioned adjacent the opposite side of the solid electrolyte.

These and various other objects, features and advantages of the invention will be better understood from the following description taken in connection with the accompanying drawing in which:

The single FIGURE of the drawing is a partial sectional view of a battery made in accordance with our invention;

In the single FIGURE of the drawing, there is shown generally at 10 a battery embodying our invention which has an inner vessel 11 with a solid sodium ion-conductive material wall portion 12 at one end thereof. A first electrode 13 is positioned within inner vessel 11. A first electronic conductor 14 contacts first electrode 13.

An outer vessel 15, which has an open end 16 and a closed end 17, surrounds wall portion 12 of inner vessel 11. A second electrode 18 is positioned within outer vessel 15 and contacts wall portion 12. A second electronic conductor 19 contacts second electrode 18. A first cover 20 closes the open end of outer vessel 15 while a second cover 21 closes the open end of inner vessel 11.

An opening can be provided in opposite closed end 17 or can be located at other points in outer vessel 15. A fill tube can be affixed to closed end 17 and in communication with the opening. The tube is closed, for example, by a removable closure.

One of the electrodes 13 is shown as the anode which consists of sodium in a non-aqueous organic electrolyte of purified 1,2-dimethoxyethane containing a dissolved sodium salt therein, which salt is selected from the class consisting of sodium perchlorate and sodium bromide. The other electrode 18 is shown as the cathode consisting of bromine and sodium bromide in propylene carbonate.

We discovered that we could form a sodium-bromine battery by providing inner vessel 11 of a chemically stable material glass such as niobium or Kovar alloy when used to contain the anode as shown in the single FIGURE of the drawing. Inner vessel 11 is provided at its lower end with a solid sodium ion-conducting material wall portion 12. Cathode 18 is in contact with the exterior surface of wall portion 12. Preferred anode 13 is shown in the form of a block or piece of solid sodium in a non-aqueous electrolyte of pure 1,2-dimethoxyethane containing a dissolved sodium salt therein. Pure 1,2-dimethoxyethane is 1,2-dimethoxyethane from which water is substantially removed to the point where water content is only several parts per million. We found that the salt could be selected from the class consisting of sodium perchlorate and sodium bromide. First electronic conductor 14 is shown as contacting anode 13 by being embedded in the solid sodium chunk, extending upwardly through the inner vessel 11, and extending outwardly through a closure 21. The closure is shown in the form of rubber stopper 22 which is covered on the outside with silicone rubber 23. We found further that the inner vessel can have a solid sodium ion-conducting material wall portion covering its lower open end or the vessel can consist of a larger segment of the same material. Additionally, the entire inner vessel can consist of solid sodium ion-conducting material. Inner vessel 11 is positioned within outer vessel 15 by being in an opening 24 in closure 20 which is in the form of a rubber stopper. Outer vessel 15 is made of a chemically stable material such as glass, niobium or tantalum when used to contain the cathode, as shown in the single FIGURE of the drawing. Second electronic conductor 19 extends from cathode solution 18 through an opening 25 in closure 20. Inner vessel 11 has at least its wall portion 12 in contact with cathode 18.

We found that various cathode 18 are suitable for employment in our sodium-halogen battery. The cathode can be a mixture of bromine and iodine with electrically conductive material, bromine with electrically conductive material, bromine in an organic solvent or iodine in an organic solvent. When the cathode is a mixture of bromine and iodine, the iodine content in the mixture is 5 to 60 weight percent. An electrically conductive material is associated with the mixture of bromine and iodine to form the cathode. Such electrically conductive materials include a porous matrix of carbon felt, a porous matrix of foam metal dissolved, small amounts of additives such as NaCl, NaBr, KCl, $AlCl_3$, $AlBr_3$, $PoCl_3$, etc. or a combination of both the matrix and the additives.

When bromine is employed as the cathode, a conductive material is used therewith which includes a porous matrix of carbon felt, a porous matrix of foam metal, a non-aqueous electrolyte or a combination of both matrix and electrolyte. A preferred non-aqueous electrolyte is the solution of sodium halide salts in propylene carbonate.

When iodine is employed as the cathode a non-aqueous electrolyte is associated therewith. A preferred non-aqueous electrolyte for iodine is a solution of sodium iodide in alcohol. The above resulting structure is a sodium-halogen battery.

We found further that an opening can be provided in outer vessel 15 which opening can have a fill closure in communication therewith. A removable cover can be positioned on the fill closure. In this manner the sodium-halogen battery can have a refillable cathode portion. In the same manner closure 20 can be removed from inner vessel 11 so that anode 13 can be replaced. In this manner there is provided a rechargeable sodium-halogen battery which is provided by mechanically replacing the anode or cathode or both the anode and cathode.

It will be evident that our sodium-halogen battery can be formed in other configurations. For example, an anode and a cathode can be placed in respective adjacent compartments which are separated by a solid sodium ion-conductive wall portion. The resulting structure is a sodium-halogen battery. If removable closures are provided for this latter structure there results a mechanically replaceable or rechargeable sodium-halogen battery.

Our battery is particularly advantageous in that it can be effectively discharged at temperatures below 20°C. One approach to obtain a temperature of operation near 20°C has been to provide the sodium in the form of an amalgam. However, the temperature of operation cannot be below 20°C because the freezing of the eutectic is at this temperature. Thus, the amalgam and solid electrolyte will loose contact when attempting a discharge below 20°C causing the cell voltage to decrease rapidly.

Examples of sodium-halogen batteries made in accordance with our invention are set forth below:

EXAMPLE I

A sodium-halogen battery was assembled as described above and as generally shown in the single FIGURE of the drawing. The outer vessel consists of a glass beaker with a rubber stopper closing the upper end thereof. Two openings were provided in the rubber stopper. An electronic conductor in the form of a platinum wire extended from within the outer vessel and outwardly through the smaller opening in the rubber stopper. The outer vessel contained a cathode consisting of a solution of 1.5 molar bromine in propylene carbonate which was saturated with sodium bromide.

The inner vessel consists of a glass tube of Corning 7056 glass. At one end of the glass tube there was sealed thereto across the opening a 0.1 centimeter thick sodium beta-alumina disk with approximately one square centimeter of surface area. The inner vessel was inserted through the larger opening in the rubber stopper of the outer vessel and positioned in contact with the cathode solution in the outer vessel. A platinum conductor was embedded at its one end in a one gram block of sodium which chunk of sodium was lowered through the inner vessel to be adjacent the sodium beta-alumina disk. One milliliter of pure 1,2-dimethoxyethane containing approximately 1 molar anhydrous sodium perchlorate was added through the tube. This solution was in contact with the disk and with the sodium block. The opposite end of the conductor extended through an opening in the rubber stopper which closed the opposite end of the glass inner vessel. The rubber stopper was coated with silicone rubber. The resulting structure was a sodium-halogen battery.

EXAMPLE II

The battery of Example I was discharged at 25°C at 20°C, and at temperatures below 20°C to demonstrate effective discharge current density of 0.5 milliampere per square centimeter. The discharge temperatures and resulting discharge voltages are set forth below in Table I.

TABLE I

| Temperature - ° Centigrade | Discharge Voltage-Volts |
|---|---|
| 25 | 2.20 |
| 15 | 1.60 |
| 10 | 1.38 |
| 5 | 1.10 |
| 2 | 0.95 |

While other modifications of the invention and variations thereof which may be employed within the scope of the invention have not been described, the invention is intended to include such as may be embraced within the following claims:

What I claim as new and desire to secure by Letters Patent of the United States is:

1. A sodium-halogen battery comprising a casing, an anode positioned in the casing, the anode consisting of sodium in a non-aqueous organic electrolyte of pure 1,2-dimethoxyethane containing a dissolved sodium salt therein, the salt selected from the class consisting of sodium perchlorate and sodium bromide, a solid sodium ion-conductive electrolyte contacting the anode, and a non-aqueous halogen cathode contacting the opposite side of the solid electrolyte.

2. A sodium-halogen battery comprising an inner vessel with a solid sodium ion-conducting material wall portion, a first electrode positioned within the inner vessel and contacting the wall portion, a first electronic conductor contacting the first electrode, an outer vessel surrounding the solid sodium ion-conductive material wall portion of the inner vessel, a second electrode within the outer vessel and contacting the outer surface of the inner wall portion, a second electronic conductor contacting the second electrode, one of the electrodes being an anode consisting of sodium in a non-aqueous organic electrolyte of purified 1,2-dimethoxyethane containing a dissolved sodium salt therein, the salt selected from the class consisting of sodium perchlorate and sodium bromide, and the other electrode being a non-aqueous halogen cathode.

3. A sodium-halogen battery as in claim 2 in which the anode is positioned within the inner vessel and the cathode is positioned within the outer vessel.

4. A sodium-halogen battery as in claim 2 in which a first cover closes the open end of the outer vessel, and a second cover closes the open end of the inner vessel.

5. A sodium-halogen battery as in claim 2 in which the inner vessel consists of a solid sodium ion-conductive material wall.

6. A sodium-halogen battery as in claim 2 in which the outer vessel has a fill closure.

* * * * *